US008635269B2

(12) United States Patent
LaFrance

(10) Patent No.: US 8,635,269 B2
(45) Date of Patent: Jan. 21, 2014

(54) SYSTEMS AND METHODS TO PROVIDE ACCESS TO A NETWORK

(75) Inventor: Ryan Marc LaFrance, Marietta, GA (US)

(73) Assignee: General Electric Company, Schenectady, NY (US)

( * ) Notice: Subject to any disclaimer, the term of this patent is extended or adjusted under 35 U.S.C. 154(b) by 54 days.

(21) Appl. No.: 13/117,256

(22) Filed: May 27, 2011

(65) Prior Publication Data

US 2012/0303829 A1  Nov. 29, 2012

(51) Int. Cl.
G06F 15/173 (2006.01)

(52) U.S. Cl.
USPC .............. 709/203; 709/220; 709/228; 701/22

(58) Field of Classification Search
USPC ........... 709/203, 220; 455/67.11, 405; 705/17
See application file for complete search history.

(56) References Cited

U.S. PATENT DOCUMENTS

| | | | |
|---|---|---|---|
| 5,694,019 A * | 12/1997 | Uchida et al. | 320/106 |
| 5,790,976 A * | 8/1998 | Boll et al. | 455/456.5 |
| 6,014,597 A * | 1/2000 | Kochanneck | 701/22 |
| 6,754,470 B2 * | 6/2004 | Hendrickson et al. | 455/67.11 |
| 6,850,153 B1 | 2/2005 | Murakami et al. | |
| 7,693,609 B2 | 4/2010 | Kressner et al. | |
| 7,698,546 B2 * | 4/2010 | Stemen | 713/2 |
| 7,844,370 B2 | 11/2010 | Pollack et al. | |
| 2003/0137277 A1 * | 7/2003 | Mori et al. | 320/132 |
| 2004/0044452 A1 | 3/2004 | Bauer et al. | |
| 2004/0072593 A1 * | 4/2004 | Robbins et al. | 455/560 |
| 2004/0106024 A1 | 6/2004 | Miyauchi et al. | |
| 2007/0271015 A1 | 11/2007 | Bauer et al. | |
| 2008/0180058 A1 | 7/2008 | Patel et al. | |
| 2008/0258890 A1 | 10/2008 | Follmer et al. | |
| 2008/0312782 A1 * | 12/2008 | Berdichevsky et al. | 701/22 |
| 2009/0021385 A1 * | 1/2009 | Kelty et al. | 340/660 |
| 2009/0045675 A1 | 2/2009 | Novak | |
| 2009/0066287 A1 | 3/2009 | Pollack et al. | |
| 2009/0082916 A1 | 3/2009 | Tanaka | |
| 2009/0139781 A1 * | 6/2009 | Straubel | 180/65.1 |
| 2009/0174365 A1 | 7/2009 | Lowenthal et al. | |
| 2009/0287578 A1 | 11/2009 | Paluszek et al. | |
| 2010/0010698 A1 | 1/2010 | Iwashita et al. | |
| 2010/0049639 A1 | 2/2010 | Ferro et al. | |
| 2010/0052882 A1 | 3/2010 | Sverrisson et al. | |
| 2010/0138363 A1 | 6/2010 | Batterberry et al. | |
| 2010/0161481 A1 | 6/2010 | Littrell | |
| 2010/0194529 A1 | 8/2010 | Yamamoto | |
| 2010/0207588 A1 | 8/2010 | Lowenthal et al. | |

(Continued)

FOREIGN PATENT DOCUMENTS

| | | |
|---|---|---|
| EP | 1394921 A2 | 3/2004 |
| GB | 2465800 A1 | 2/2010 |
| WO | 2008150412 A1 | 12/2008 |
| WO | 2008157443 A2 | 12/2008 |

*Primary Examiner* — Khanh Dinh
(74) *Attorney, Agent, or Firm* — General Electric Company

(57) ABSTRACT

A network access system for use with a charging station is provided. The network access system is configured to receive at least one signal representative of a network. The network access system is also configured to prompt a user for at least one input. Moreover, the network access system is configured to receive the input from the user, wherein the input includes a confirmation to receive access to the network. The network access system provides at least one unique identifier to the user to enable the user to receive access to the network within a distance from the charging station while a battery is being charged.

20 Claims, 3 Drawing Sheets

(56) References Cited

U.S. PATENT DOCUMENTS

| | | |
|---|---|---|
| 2010/0228405 A1 | 9/2010 | Morgal et al. |
| 2010/0274656 A1 | 10/2010 | Genschel et al. |
| 2011/0025556 A1 | 2/2011 | Bridges et al. |
| 2012/0056583 A1* | 3/2012 | Gotz ............................ 320/109 |
| 2012/0303824 A1* | 11/2012 | Anderson et al. ............. 709/227 |
| 2012/0330494 A1* | 12/2012 | Hendrix et al. ............. 701/29.3 |

* cited by examiner

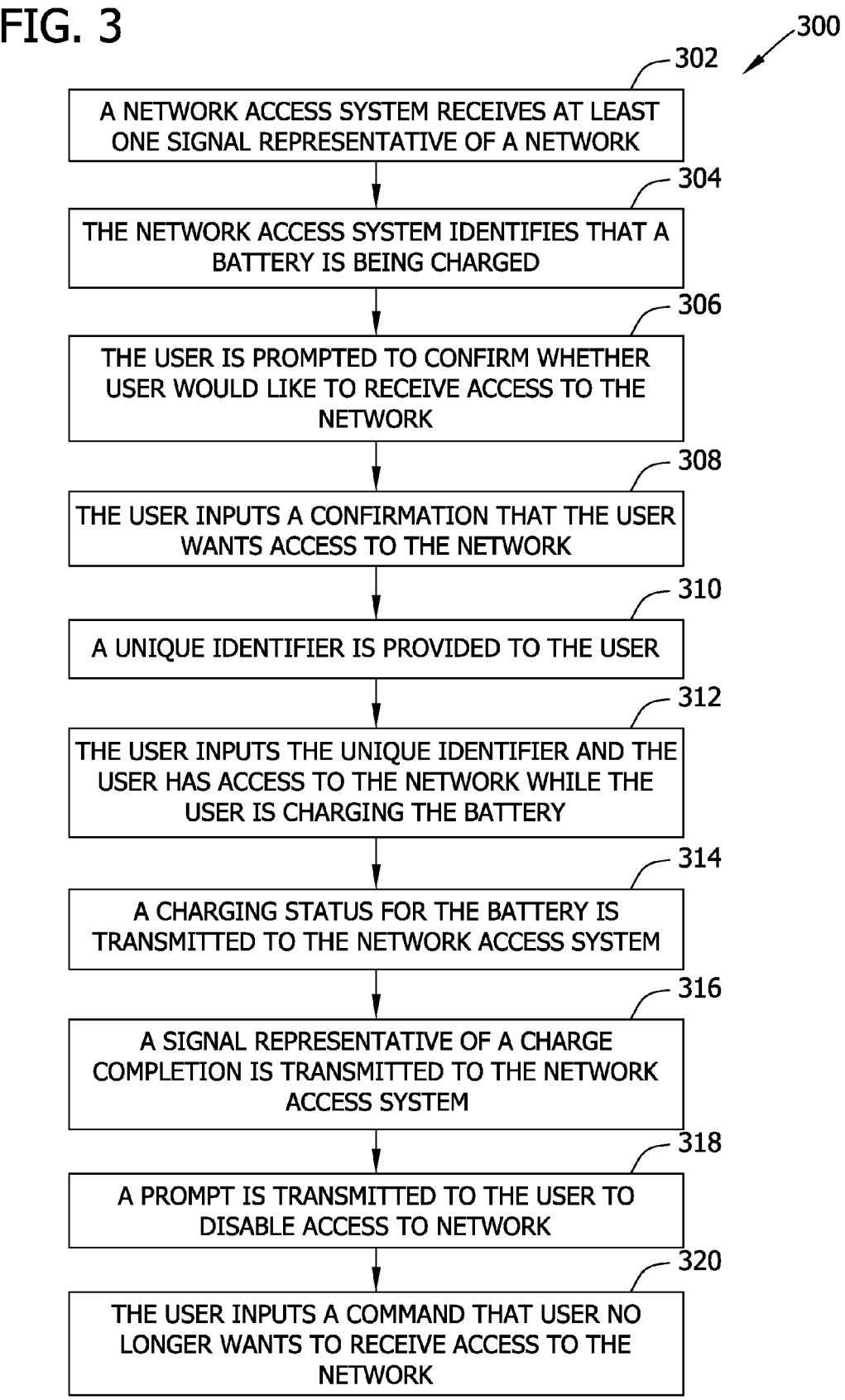

SYSTEMS AND METHODS TO PROVIDE ACCESS TO A NETWORK

BACKGROUND OF THE INVENTION

The field of the invention relates generally to charging stations and, more particularly, to a network access system for use in providing access to a network to a user of a charging station.

At least partially in response to increasing fuel costs related to the use of conventional combustion engine vehicles, the use of electric vehicles has increased. Accordingly, energy demand has increased in the form of electrical energy used to charge batteries or other energy sources used in such vehicles. Moreover, with an increase in the number of electric vehicles being used by consumers, electric vehicle charging stations (EVCS) have become increasingly prominent throughout the world in order to provide energy to the electric vehicles.

In at least some known EVCS, a user can easily activate a unit at the station to start the flow of electrical energy into a battery located within his or her electric vehicle by passing their radio frequency identification (RFID) tag across a reader located on the unit. A charging time of an electric vehicle depends on various factors including, but not being limited to, environmental conditions, the size of the vehicle's battery, the charging level and the size of the charger for the battery, and state of the charge of the battery when the vehicle is coupled to the EVCS. Depending on such factors, a typical charging time for an electric vehicle may be between approximately two hours to approximately eight hours in length.

At least some known EVCSs do not provide remote notification of a charging status of an electric vehicle. As a result, in order for a user to determine the charging status of his or her electric vehicle, the user must physically inspect the vehicle at the EVCS. As such, the charging process can be a tedious and/or time consuming task for the user and not knowing when the electric vehicle is charged may impose constraints as to how far the user can travel from the charging station. Such limitations may cause the user to suffer from boredom while he or she waits for the electric vehicle to charge. Moreover, at least some known EVCSs do not provide access to a network to enable the user to access the internet or perform other activities while the user waits for his or her electric vehicle to charge.

BRIEF DESCRIPTION OF THE INVENTION

In one embodiment, a network access system for use with a charging station is provided. The network access system is configured to receive at least one signal representative of a network. The network access system is also configured to prompt a user for at least one input. Moreover, the network access system is configured to receive the input from the user, wherein the input includes a confirmation to receive access to the network. The network access system provides at least one unique identifier to the user to enable the user to receive access to the network within a distance from the charging station while a battery is being charged.

In another embodiment, a charging station is provided. The charging station includes an energy delivery device that is coupled to an energy source for selectively supplying energy to a battery that is coupled within an electric vehicle. Moreover the charging station includes a network access system that is coupled to the energy delivery device. The network access system includes at least one processor that is programmed to receive at least one signal representative of a network and to prompt a user for at least one input. The processor is further programmed to receive the input from the user, wherein the input includes a confirmation to receive access to the network. Moreover, the processor is programmed to provide at least one unique identifier to the user to enable the user to receive access to the network within a distance from the charging station while the battery is being charged.

In yet another embodiment, a method for providing access to a network to a user of a charging station is provided. The method includes receiving at least one signal representative of a network. The method also includes prompting a user for at least one input. The input is received from the user, wherein the input includes a confirmation to receive access to the network. At least one unique identifier is provided to the user to enable the user to receive access to the network within a distance from the charging station while the battery is being charged.

BRIEF DESCRIPTION OF THE DRAWINGS

FIG. 3 is an exemplary method for providing access to a network to a user of the electric vehicle charging station shown in FIG. 1.

DETAILED DESCRIPTION OF THE INVENTION

The exemplary systems and methods described herein overcome at least some known disadvantages of known electric vehicle charging stations by providing access to a network to enable a user to access the internet or perform other activities while he or she waits for an electric vehicle to charge. More specifically, the embodiments described herein provide a network access system for use with an electric vehicle charging station. The network access system is configured to receive at least one signal representative of a network and to prompt a user for at least one input. Moreover, the network access system is configured to receive the input from the user, wherein the input includes a confirmation to receive access to the network. The network access system provides at least one unique identifier to the user to enable the user to receive access to the network within a distance from the charging station while the battery is being charged. Accordingly, the user is enabled to perform activities and functions such that the user doe not suffer from boredom while the user waits for his or her electric vehicle to charge.

Figure 1:
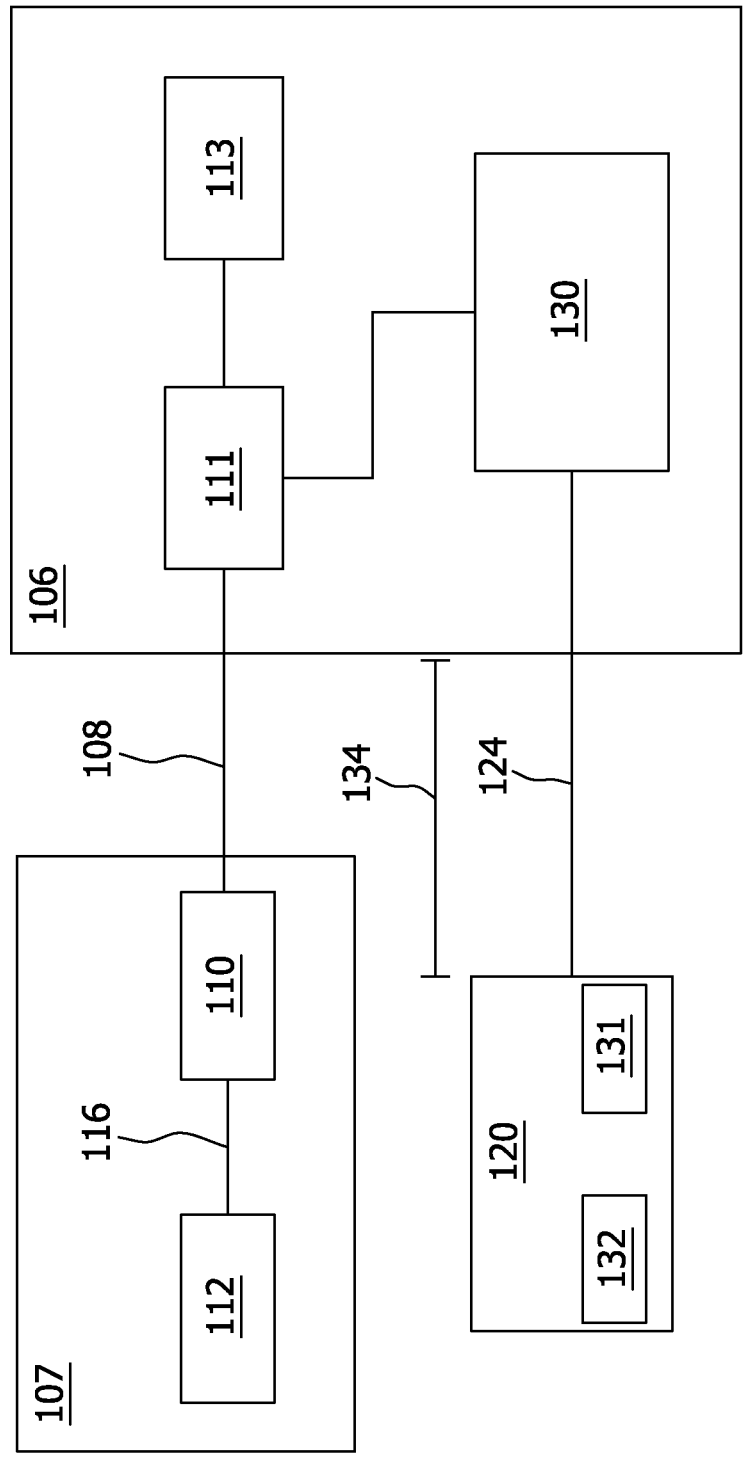
FIG. 1 is a block diagram of an exemplary electric vehicle charging station.

FIG. 1 is a block diagram of an electric vehicle charging station 106. In the exemplary embodiment, at least one electric vehicle 107 is coupled to charging station 106 via a conduit 108. Alternatively, electric vehicle 107 may be wirelessly coupled to charging station 106. It should be noted that, as used herein, the term "couple" is not limited to a direct mechanical, electrical, and/or communication connection between components, but may also include an indirect mechanical, electrical, and/or communication connection between multiple components.

It should also be noted that the term "electric vehicle" refers generally to a vehicle that includes one or more electric motors (not shown) that are used to provide propulsion to the vehicle. Energy, such as electrical energy, used to generate power and propel electric vehicles may come from various sources, such as, but not limited to, an on-board rechargeable battery and/or an on-board fuel cell. In one embodiment, the electric vehicle is a hybrid electric vehicle, which captures and stores energy generated by braking. Moreover, a hybrid electric vehicle uses energy stored in an electrical source, such as a battery, to continue operating when idling to conserve fuel. Some hybrid electric vehicles are capable of recharging the battery by plugging into a power receptacle, such as a general power outlet. Another example of an electric vehicle is a fuel-cell vehicle, which uses only electrical energy for propulsion. Accordingly, the term "electric vehicle" as used herein may refer to a hybrid electric vehicle, a fuel-cell vehicle, or any other vehicle to which electrical energy may be delivered via a power grid.

In the exemplary embodiment, electric vehicle 107 includes a battery 110. In the exemplary embodiment, battery 110 is a rechargeable lithium-ion battery 110. Alternatively, battery 110 may be any other lithium-based battery or any other type of battery that enables electric vehicle 107 to function as described herein.

Moreover, in the exemplary embodiment, electric vehicle 107 is coupled to an energy delivery device 111 that is included within electric vehicle charging station 106. More specifically, battery 110 is coupled to energy delivery device 111 via conduit 108. Alternatively, battery 110 is wirelessly coupled to energy delivery device 111. Moreover, in the exemplary embodiment, energy delivery device 111 is coupled to an energy source 113. Energy delivery device 111 selectively supplies energy, such as electrical energy, from energy source 113 to battery 110. Electric vehicle 107 is configured to store the electrical energy in battery 110 and to use the stored electrical energy for propulsion, rather than, or in addition to, more conventional energy sources, such as gasoline. Moreover, in the exemplary embodiment, conduit 108 is fabricated from a metallic wire. Alternatively, conduit 108 may be fabricated from any other substance or compound that enables conduit 108 to deliver electrical energy to electric vehicle 107 and that enables charging station 106 to function as described herein.

Moreover, in the exemplary embodiment, electric vehicle 107 also includes a vehicle communication module 112 that is coupled to battery 110 via a conduit 116. In the exemplary embodiment, vehicle communication module 112 is also wirelessly coupled to charging station 106 to enable electric vehicle 107 to communicate with charging station 106. More specifically, module 112 enables electric vehicle 107 to communicate when the charging of battery 110 commences and the amount of an electrical charge that is received by battery 110 to charging station 106. Alternatively, module 112 may enable electric vehicle 107 to communicate any other information regarding electric vehicle 107 to charging station 106.

Moreover, charging station 106 enables at least one user having at least one computing device 120 to have access to a network 124 via a network access system 130. In the exemplary embodiment, network access system receives a signal representative of network 124, such as a Wi-Fi signal. Wi-Fi is a registered trademark owned by the Wi-Fi Alliance, a global non-profit organization. Moreover, in the exemplary embodiment, computing device 120 includes a presentation interface 131 and a user interface 132. Further, in the exemplary embodiment, computing device 120 is a device that is enabled by network 124, such as a lap top computer, a video game console, a Smartphone, or a digital audio player.

In the exemplary embodiment, presentation interface 131 presents information, such as an application source code, input events, and/or validation results to the user of electric vehicle 107. In the exemplary embodiment, presentation interface 131 includes a display adapter (not shown) that is coupled to at least one display device (not shown). In the exemplary embodiment, the display device includes a visual display, such as a cathode ray tube (CRT), a liquid crystal display (LCD), an organic LED (OLED) display, and/or an "electronic ink" display. Alternatively, presentation interface 131 may include an audio output device, such as an audio adapter and/or a speaker. Moreover, in the exemplary embodiment, user interface 132 receives any information suitable for use with system 130 and/or computing device 120 described herein. Moreover, in the exemplary embodiment, user interface 132 may include, for example, a keyboard, a pointing device, a mouse, a stylus, a touch sensitive panel (e.g., a touch pad or a touch screen), a gyroscope, an accelerometer, a position detector, and/or an audio input interface (e.g., including a microphone). Alternatively, a single component, such as a touch screen, may function as both a display device of presentation interface 131 and user interface 132.

In the exemplary embodiment, computing device 120 is communicatively coupled to charging station 106 via network 124. More specifically, computing device 120 is coupled to network access system 130 within charging station 106 via network 124. In the exemplary embodiment, network 124 may include, for example, a wireless local area network (WLAN), the Internet, a local area network (LAN), a wide area network (WAN), a mesh network, and/or a virtual private network (VPN). Moreover, in the exemplary embodiment, network access system 130 is coupled within charging station 106 and is coupled to energy delivery device 111. Alternatively, network access system 130 may not be coupled within charging station 106 and may be coupled within another apparatus and/or system, such as electric vehicle 107.

Moreover, in the exemplary embodiment, charging station 106 and computing device 120 communicate with each other and/or network 124 using wireless communication means. More specifically, in the exemplary embodiment, network access system 130 communicates with computing device 120 using wireless communication means, such as radio frequency (RF), an Institute of Electrical and Electronics Engineers (IEEE) 802.11 standard (e.g., 802.11(g) or 802.11(n)), a satellite communication link, cellular phone technology (e.g., the Global Standard for Mobile communication (GSM)), and/or any other suitable communication means. Alternatively, network access system and computing device 120 may communicate with each other and/or network 124 using other means, such as a wired network connection (e.g., Ethernet or an optical fiber), the Worldwide Interoperability for Microwave Access (WIMAX) standard, and/or any other suitable communication means. WIMAX is a registered trademark of WiMax Forum, of Beaverton, Oreg. IEEE is a registered trademark of the Institute of Electrical and Electronics Engineers, Inc., of New York, N.Y.

During operation, when a state of charge of electric vehicle battery 110 is below a desired charge level, a user can go to charging station 106 and couple battery 110 to energy delivery device 111. When electric vehicle 107 is coupled to energy delivery device 111, electrical energy is transmitted from energy delivery device 111 to battery 110 via conduit 108. When charging of battery 110 commences, a signal representative of the commencement is transmitted to charging station 106 via vehicle communication module 112. More specifically, in the exemplary embodiment, network access system 130 receives the signal and then prompts the user to confirm whether the user would like to receive access to network 124. In the exemplary embodiment, the user is prompted to confirm via presentation interface 131 within computing device 120 whether the user would like to receive access to network 124. Alternatively, the user may also input information directly into network access system 130 via a user interface (not shown in FIG. 1) located on system 130 to enable access to network 124 prior to charging battery 110. Network access system 130 may also prompt the user via a presentation interface (not shown in FIG. 1) coupled within system 130 to confirm whether the user would like to receive access to network 124.

In the exemplary embodiment, the user inputs a confirmation that the user wants access to network 124 via user interface 132 within computing device 120. Alternatively, the user may provide an input via the user interface coupled within system 130. Network access system 130 then provides a unique identifier to the user and the user is enabled to access network 124 via computing device 120 within a distance 134 from the charging station while the battery is being charged. In the exemplary embodiment, network access system 130 provides the user a unique identifier. For example, network access system 130 may provide at least a username and/or a password, such as a service set identifier (SSID) and/or a shared 256-bit wired equivalent privacy (WEP) algorithm, such that the user can access network 124. Alternatively, network access system 130 may provide the username and/or password, such as the SSID and/or the shared 256-bit WEP algorithm, once network 124 has already been accessed by the user. Network access system 130 may also provide another unique identifier that enables system 130 and charging station 106 to function as described herein.

Moreover, in the exemplary embodiment, as battery 110 is being charged, a charging status for the battery 110, such as the amount of electrical charge that is received by battery 110, is transmitted to charging station 106 via vehicle communication module 112. More specifically, the charging status for battery 110 is transmitted to network access system 130. Similarly, when the charging status is complete, a signal representative of the completed charge is transmitted to system 130 and access to network 124 may be disabled. More specifically, in the exemplary embodiment, the user is prompted via presentation interface 131 within computing device 120 to confirm whether the user would like to continue receiving access to network 124 or whether the user would like to terminate his or her access to network 124. Alternatively, network access system 130 may prompt the user via the presentation interface coupled within system 130.

In the exemplary embodiment, the user inputs a command via user interface 132 that the user no longer wants to receive access to network 124. Alternatively, the user may provide the input via the user interface coupled within system 130. Moreover, as an alternative to the exemplary embodiment, the user may input a command to no longer receive access to network 124 prior to the charge completion of battery 110.

Figure 2:
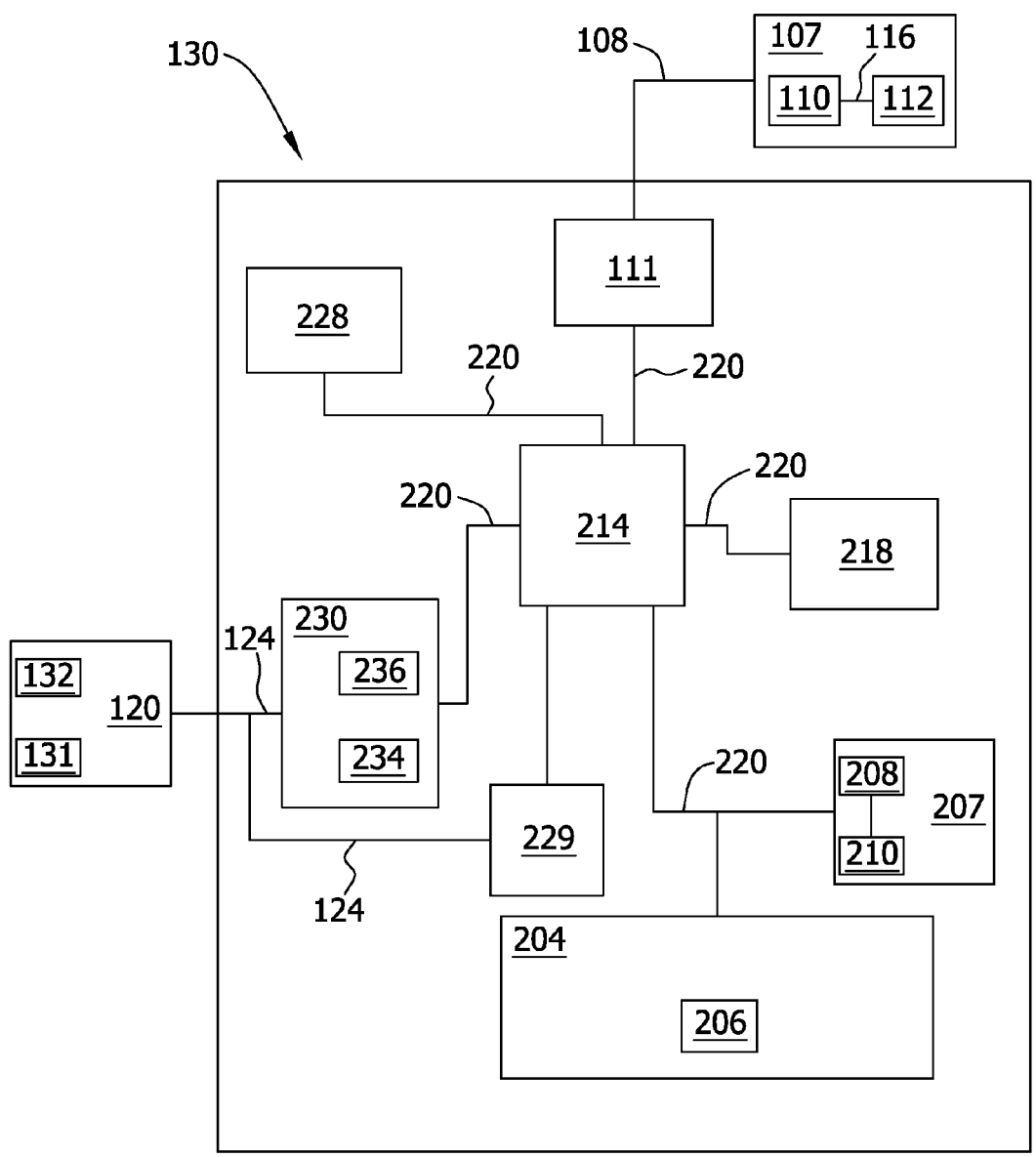
FIG. 2 is a block diagram of an exemplary network access system that may be used with the electric vehicle charging station shown in FIG. 1.

FIG. 2 is a block diagram of network access system 130 that is coupled within charging station 106 (shown in FIG. 1). Network access system 130 includes a user interface 204 that receives at least one input from a user (not shown). In the exemplary embodiment, user interface 204 includes a keyboard 206 that enables a user to input pertinent information. Alternatively, user interface 204 may include, for example, a pointing device, a mouse, a stylus, a touch sensitive panel (e.g., a touch pad or a touch screen), a gyroscope, an accelerometer, a position detector, and/or an audio input interface (e.g., including a microphone).

Moreover, in the exemplary embodiment, network access system 130 includes a presentation interface 207 that presents information, such as input events and/or validation results, to the user. In the exemplary embodiment, presentation interface 207 includes a display adapter 208 that is coupled to at least one display device 210. More specifically, in the exemplary embodiment, display device 210 is a visual display device, such as a cathode ray tube (CRT), a liquid crystal display (LCD), an organic LED (OLED) display, and/or an "electronic ink" display. Alternatively, presentation interface 207 may include an audio output device (e.g., an audio adapter and/or a speaker) and/or a printer.

Network access system 130 also includes a processor 214 and a memory device 218. In the exemplary embodiment, processor 214 is coupled to user interface 204, presentation interface 207, and to memory device 218 via a system bus 220. In the exemplary embodiment, processor 214 communicates with computing device 120 and/or with the user, such as by prompting the user via presentation interface 207 and/or presentation interface 131 and by receiving user inputs via user interface 204 and/or user interface 132. Moreover, in the exemplary embodiment, processor 214 is programmed by encoding an operation using one or more executable instructions and providing the executable instructions in memory device 218. The term "processor" refers generally to any programmable system including systems and microcontrollers, reduced instruction set circuits (RISC), application specific integrated circuits (ASIC), programmable logic circuits (PLC), and any other circuit or processor capable of executing the functions described herein. The above examples are exemplary only, and thus are not intended to limit in any way the definition and/or meaning of the term "processor."

In the exemplary embodiment, memory device 218 is one or more devices that enable information, such as executable instructions and/or other data, to be stored and retrieved. Moreover, in the exemplary embodiment, memory device 218 includes one or more computer readable media, such as, without limitation, dynamic random access memory (DRAM), static random access memory (SRAM), a solid state disk, and/or a hard disk. In the exemplary embodiment, memory device 218 stores, without limitation, application source code, application object code, configuration data, additional input events, application states, assertion statements, validation results, and/or any other type of data. More specifically, in the exemplary embodiment, memory device 218 stores input data received by the user via user interface 204, information received from electric vehicle 107, and/or information received from computing device 120.

Network access system 130, in the exemplary embodiment, also includes a monitoring device 228, a network interface 229, and a communication interface 230 that are each coupled to processor 214 via system bus 220. Moreover, energy delivery device 111 is coupled to processor 214 via system bus 220. In the exemplary embodiment, monitoring device 228 is coupled to electric vehicle 107. More specifically, monitoring device 228 is coupled to vehicle communication module 112 via a wireless connection. Alternatively, monitoring device 228 and vehicle communication module 112 may be coupled via a cable or a connector. Further, in the exemplary embodiment, monitoring device 228 receives the charging status of battery 110 from electric vehicle 107 via vehicle communication module 112. Moreover, in the exemplary embodiment, network interface 229 is configured to receive a network signal, such as a Wi-Fi signal, and configured to transmit the network signal to computing device 120.

Moreover, in the exemplary embodiment, communication interface 230 is communicatively coupled to computing device 120 via network 124. Moreover, communication interface 230 includes at least one adaptor, such as adaptor 234 and adaptor 236. In the exemplary embodiment, adaptor 234 is a wireless network adaptor and adaptor 236 is a mobile telecommunications adaptor. Alternatively, communication interface 230 may include any other type of adaptor, such as a wired network adaptor, that enables network access system 130 and charging station 106 to function as described herein. In the exemplary embodiment, communication interface 230 communicates with computing device 120 and/or electric vehicle 107.

During operation, when a charge on battery 110 of electric vehicle 107 is below a desired charge level, the user takes electric vehicle 107 to charging station 106 and couples battery 110 to energy delivery device 111. When electric vehicle 107 is coupled to energy delivery device 111, electrical energy is transmitted from energy delivery device 111 to battery 110 via conduit 108. When charging of battery 110 commences, a signal representative of the commencement is transmitted to charging station 106 via vehicle communication module 112. More specifically, in the exemplary embodiment, the signal representative of the charging is communicated to monitoring device 228. Monitoring device 228 transmits the signal to processor 214 and to memory device 218.

Processor 214 then transmits a signal, via communication interface 230, that is representative of a prompt to the user to confirm whether the user would like to receive access to network 124. More specifically, in the exemplary embodiment, the user is prompted to confirm, via presentation interface 131 within computing device 120, whether user would like to receive access to network 124. Alternatively, the user may also input information directly into network access system 130 via user interface 204 to enable access to network 124 prior to charging battery 110. Network access system 130 may also prompt the user via presentation interface 207 to confirm whether the user would like to receive access to network 124.

In the exemplary embodiment, the user inputs a confirmation that the user wants access to network 124 via user interface 132 within computing device 120. Alternatively, the user may provide an input via user interface 204 within system 130. Processor 214 then transmits, via communication interface 230, a unique identifier, such as a username and/or password, to the user. More specifically, in the exemplary embodiment, the unique identifier is presented to the user via presentation interface 131. Alternatively, network access system 130 may provide the unique identifier, such as the username and/or the password, once network 124 has already been accessed by the user. Network access system 130 may also provide the unique identifier to the user via presentation interface 207.

When the user receives the unique identifier, the user is enabled to access network 124 via computing device 120. More specifically, the user inputs the unique identifier via user interface 132. Alternatively, the user may input the unique identifier via user interface 204. Processor 214 receives and authenticates the unique identifier and sends a signal to network interface 229. Network interface 229 then enables a signal representative of network 124 to be transmitted to computing device 120. Accordingly, the user has access to network 124 within distance 134 (shown in FIG. 1) from charging station 106 while the user is charging battery 110.

Moreover, in the exemplary embodiment, as battery 110 is being charged, a charging status for battery 110 is transmitted to charging station 106 via vehicle communication module 112. More specifically, a signal representative of the charging status is communicated to monitoring device 228. Monitoring device 228 transmits the signal to processor 214 and to memory device 218. Similarly, a signal representative of a charge completion is communicated to monitoring device 228 and the signal is transmitted to processor 214 and to memory device 218. Processor 214 then transmits, via communication interface 230, a prompt to the user to disable access to network 124. More specifically, communication interface 230 transmits a prompt via presentation interface 131 within computing device 120 to confirm whether the user would like to continue receiving access to network 124 or whether the user would like to terminate his or her access to network 124. Alternatively, communication interface 230 may transmit the prompt via presentation interface 207 within system 130.

In the exemplary embodiment, the user inputs a command via user interface 132 that user no longer wants to receive access to network 124. Alternatively, the user may provide the input via user interface 204. Moreover, as an alternative to the exemplary embodiment, the user may input a command to terminate access to network 124 prior to the charge completion of battery 110.

FIG. 3 is a flow chart of an exemplary method 300 that may be used to provide access to a network, such as network 124 (shown in FIGS. 1 and 2) to a user of an electric vehicle charging station, such as charging station 106 (shown in FIG. 1), wherein charging station 106 includes a network access system 130, such as network access system 130 (shown in FIGS. 1 and 2). Network access system 130 receives 302 at least one signal representative of network 124, such as a Wi-Fi signal, via a network interface 229 (shown in FIG. 2). Network access system 130 identifies 304 that a battery 110 (shown in FIGS. 1 and 2) is being charged. More specifically, when charging of battery 110 commences, a signal representative of the commencement is transmitted to network access system 130 via a vehicle communication module 112 (shown in FIGS. 1 and 2) such that a processor 214 (shown in FIG. 2) within network access system 130 can identify that battery 110 is being charged.

In the exemplary embodiment, the user is prompted 306 to confirm, via a presentation interface 131 (shown in FIGS. 1 and 2) within a computing device 120 (shown in FIGS. 1 and 2), whether user would like to receive access to network 124. The user inputs 308 a confirmation that the user wants access to network 124 via a user interface 132 (shown in FIGS. 1 and 2) within computing device 120. A unique identifier, such as a username and/or password, is provided 310 to the user via presentation interface 131. The user inputs 312 the unique identifier via user interface 132 and the user has access to network 124 within a distance 134 (shown in FIG. 1) from charging station 106 while the user is charging battery 110.

Moreover, in the exemplary embodiment, as battery 110 is being charged, a charging status for battery 110 is transmitted 314 to network access system 130 via vehicle communication module 112. Similarly, a signal representative of a charge completion is transmitted 316 to network access system 130. A prompt is transmitted 318 to the user to disable access to network 124. More specifically, communication interface 230 transmits a prompt via presentation interface 131 within computing device 120 to confirm whether the user would like to continue receiving access to network 124 or whether the user would like to terminate his or her access to network 124. The user inputs 320 a command via user interface 132 that user no longer wants to receive access to network 124.

As compared to known electric vehicle charging stations, the above-described embodiments provide a user of an electric vehicle charging station access to a network to enable a user to access the internet or perform other activities while the user waits for his or her electric vehicle to charge. More specifically, the embodiments described herein provide a network access system for use with an electric vehicle charging station. The network access system is configured to receive at least one signal representative of a network and to identify that a battery is being charged in order to prompt a user for at least one input. Moreover, the network access system is configured to receive the input from a user, wherein the input includes a confirmation to receive access to the network. The network access system provides at least one unique identifier to the user to enable the user to receive access to the network within a distance from the charging station while the battery is being charged. Accordingly, the user is enabled to perform activities and functions such that the user doe not suffer from boredom while the user waits for his or her electric vehicle to charge.

A technical effect of the systems and methods described herein includes at least one of: (a) receiving at least one signal representative of a network; (b) identifying that a battery is being charged in order to prompt a user for at least one input; (c) receiving at least one input from the user, wherein the at least one input includes a confirmation to receive access to a network; and (d) providing at least one unique identifier to a user to enable the user to receive access to a network within a distance from the charging station while the battery is being charged.

Exemplary embodiments of systems and methods for use in providing access to a network are described above in detail. The systems and methods are not limited to the specific embodiments described herein, but rather, components of each system and/or steps of each method may be utilized independently and separately from other components and/or steps described herein. For example, each system may also be used in combination with other systems and methods, and is not limited to practice with only systems as described herein. Rather, the exemplary embodiment can be implemented and utilized in connection with many other applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A network access system for use with a charging station, said network access system configured to:
    receive at least one signal representative of a network;
    receive notification that energy is being delivered from the charging station to a battery coupled within an electric vehicle;
    prompt, based on the notification, a user for at least one input;
    receive the at least one input from the user, wherein the at least one input includes a confirmation to receive access to the network;
    provide at least one unique identifier to the user to enable the user to receive access to the network within a specified distance from the charging station; and
    disable access to the network based on at least one of receiving notification that a charging status of the battery is complete and determining the user is outside the specified distance from the charging station.

2. A network access system in accordance with claim 1, wherein the network is a wireless network that provides access to the interne.

3. A network access system in accordance with claim 1, wherein the at least one unique identifier includes at least one of a username and a password.

4. A network access system in accordance with claim 1, wherein the at least one signal representative of the network is a Wi-Fi signal.

5. A network access system in accordance with claim 1, further configured to receive at least one signal representative of the charging status of the battery.

6. A network access system in accordance with claim 4, wherein the network access system is configured to disable the user from receiving access to the network when the signal representative of the charging status of the battery indicates that the charging status is complete.

7. A network access system in accordance with claim 1, wherein the network access system is further configured to disable the user from receiving access to the network based on a user command received from the user.

8. A charging station comprising:
    an energy delivery device coupled to an energy source for selectively supplying energy to a battery coupled within an electric vehicle;
    a network access system coupled to said energy delivery device, said network access system comprising at least one processor programmed to:
        receive at least one signal representative of a network;
        receive notification that energy is being delivered from said charging station to the battery;
        prompt, based on the notification, a user for at least one input;
        receive the at least one input from the user, wherein the at least one input includes a confirmation to receive access to the network;
        provide at least one unique identifier to the user to enable the user to receive access to the network within a specified distance from said charging station; and
        disable access to the network based on at least one of receiving notification that a charging status of the battery is complete and determining the user is outside the specified distance from the charging station.

9. A charging station in accordance with claim 8, wherein the network is a wireless network that provides access to the internet.

10. A charging station in accordance with claim 8, wherein the at least one unique identifier includes at least one of a username and a password.

11. A charging station in accordance with claim 10, wherein the at least one signal representative of the network is a Wi-Fi signal.

12. A charging station in accordance with claim 8, wherein said at least one processor is further programmed to receive at least one signal representative of a charging status of the battery.

13. A charging station in accordance with claim 8, wherein said at least one processor is programmed to disable the user from receiving access to the network when the signal representative of the charging status of the battery indicates that the charging status is complete.

14. A charging station in accordance with claim 8, wherein said at least one processor is further programmed to disable the user from receiving access to the network based on a user command received from the user.

15. A method for providing access to a network to a user of a charging station, said method comprising:
- receiving at least one signal representative of a network;
- receiving notification that energy is being delivered from the charging station to a battery coupled within an electric vehicle;
- prompting, based on the notification, a user for at least one input;
- receiving the at least one input from the user, wherein the at least one input includes a confirmation to receive access to the network;
- providing at least one unique identifier to the user to enable the user to receive access to the network within a specified distance from the charging station; and
- disabling access to the network based on at least one of receiving notification that a charging status of the battery is complete and determining the user is outside the specified distance from the charging station.

16. A method in accordance with claim 15, wherein receiving at least one signal further comprises receiving at least one signal representative of a wireless network that provides access to the internet.

17. A method in accordance with claim 15, wherein providing at least one unique identifier further comprises providing at least one of a username and a password.

18. A method in accordance with claim 15, wherein receiving at least one signal further comprises receiving a Wi-Fi signal.

19. A method in accordance with claim 15, further comprising:
- receiving at least one signal representative of a charging status of the battery,
- disabling the user from receiving access to the network includes disabling the user from receiving access to the network when the signal representative of the charging status of the battery indicates that the charging status is complete.

20. A method in accordance with claim 15, wherein disabling the user from receiving access to the network includes disabling the user from receiving access to the network based on a user command received from the user and at least one of receiving notification that a charging status of the battery is complete and determining the user is outside the specified distance from the charging station.

* * * * *

UNITED STATES PATENT AND TRADEMARK OFFICE
CERTIFICATE OF CORRECTION

PATENT NO. : 8,635,269 B2  
APPLICATION NO. : 13/117256  
DATED : January 21, 2014  
INVENTOR(S) : LaFrance et al.

Page 1 of 1

It is certified that error appears in the above-identified patent and that said Letters Patent is hereby corrected as shown below:

In the Claims

In Column 10, Line 5, in Claim 2, delete "interne." and insert -- internet. --, therefor.

Signed and Sealed this  
Twentieth Day of May, 2014

Michelle K. Lee  
*Deputy Director of the United States Patent and Trademark Office*